(12) United States Patent
Philipp

(10) Patent No.: US 11,698,445 B2
(45) Date of Patent: Jul. 11, 2023

(54) AUTOMOTIVE LIDAR WITH MULTI-SPECTRAL DEPTH IMAGING AND DISCRETE SCANNING MECHANISM

(71) Applicant: GM Global Technology Operations LLC, Detroit, MI (US)

(72) Inventor: Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1011 days.

(21) Appl. No.: 16/120,969

(22) Filed: Sep. 4, 2018

(65) Prior Publication Data
US 2020/0072950 A1 Mar. 5, 2020

(51) Int. Cl.
G01S 7/481 (2006.01)
G01S 7/499 (2006.01)
G01S 17/931 (2020.01)

(52) U.S. Cl.
CPC ............ G01S 7/4817 (2013.01); G01S 7/499 (2013.01); G01S 17/931 (2020.01)

(58) Field of Classification Search
None
See application file for complete search history.

(56) References Cited

U.S. PATENT DOCUMENTS

| | | | | |
|---|---|---|---|---|
| 4,270,862 A * | 6/1981 | Hewitt | .................... | G01S 7/499 356/141.1 |
| 7,116,370 B1 * | 10/2006 | Huang | .................... | G02B 27/28 348/335 |
| 8,526,472 B2 * | 9/2013 | Flanders | ............ | G01B 9/02091 372/20 |
| 8,786,759 B2 * | 7/2014 | Wang | ............... | H04N 5/232122 348/344 |
| 10,613,413 B1 * | 4/2020 | Lu | ........................ | G02B 27/0172 |
| 11,175,508 B2 * | 11/2021 | Jamali | ................... | G02B 26/106 |
| 2011/0228249 A1 * | 9/2011 | Koehler | ................... | G01S 17/89 356/4.01 |
| 2011/0242461 A1 * | 10/2011 | Escuti | ................... | H04N 9/3167 349/96 |

(Continued)

FOREIGN PATENT DOCUMENTS

| CN | 106125445 A | * 11/2016 | ............. G02F 1/292 |
|---|---|---|---|
| GB | 2280328 A | * 1/1995 | ............. G01S 7/4811 |

OTHER PUBLICATIONS

Friso Schlottau, Journal of Luminescence, vol. 127, Issue 1, Nov. 2007, pp. 135-145 (Year: 2007).*

(Continued)

Primary Examiner — Yuqing Xiao
Assistant Examiner — Jempson Noel
(74) Attorney, Agent, or Firm — Cantor Colburn LLP

(57) ABSTRACT

A vehicle, Lidar system for the vehicle and method of scanning an object with the Lidar system. The Lidar system includes a first quarter wave plate, a first deflection stage and a detector. The first quarter wave plate produces a circularly polarized scanning beam of light. The first deflection stage selects a rotation direction for a polarization vector of the scanning beam and deflects the scanning beam by a selected angle based on the selected rotation direction of the polarization vector. The detector receives a reflected beam that is a reflection of the scanning beam from the object.

17 Claims, 6 Drawing Sheets

(56) References Cited

U.S. PATENT DOCUMENTS

| | | | |
|---|---|---|---|
| 2012/0188467 A1* | 7/2012 | Escuti | G02F 1/1347 349/1 |
| 2019/0075281 A1* | 3/2019 | Hall | G06F 3/0325 |
| 2020/0300992 A1* | 9/2020 | Uetsuka | G01S 7/499 |
| 2021/0263358 A1* | 8/2021 | Fells | G02F 1/1393 |

OTHER PUBLICATIONS

English version of CN 106125445 A (Year: 2016).*
Core Technologies, BNS Liquid Crystal Solutions, Boulder Nonlinear Systems, Inc. 4 pages.
Stockley et al., "Broadband Beam Steering," Society of Photo Instrumentation Engineers, vol. 3131 (1997) 14 pages.
Stockley et al., "Cascaded One-Dimensional Liquid Crystal OPAs for 2-D Beam Steering," IEEE (2003) 7 pages.

* cited by examiner

AUTOMOTIVE LIDAR WITH MULTI-SPECTRAL DEPTH IMAGING AND DISCRETE SCANNING MECHANISM

INTRODUCTION

The subject disclosure relates to automotive Lidar systems and methods of operation and, in particular, to a method for scanning a Lidar system across a field-of-view.

Lidar systems can be used in vehicles in order to image a field of view and locate objects. The Lidar system directs light outward over a range of angles and receives reflections of the light from the objects. These systems often use a mechanical device, such as spinning disks or polygons, a phased array or a microelectromechanical (MEMS) device in order to disperse an outgoing beam of light. Such mechanical devices comes with resolution issues, assembly issues and temperature dependence issues. Accordingly, it is desirable to provide a beam orienting device for a Lidar system that avoids these issues.

SUMMARY

In one exemplary embodiment, a method of scanning an object with a Lidar system is disclosed. The method includes generating, at a first quarter wave plate of the Lidar system, a circularly polarized scanning beam of light propagating along a longitudinal path, passing the scanning beam through a first deflection stage of the Lidar system to select a rotation direction for a polarization vector of the scanning beam and deflect the scanning beam by a selected angle from the longitudinal path based on the selected rotation direction of the polarization vector, and receiving a reflected beam at a detector of the Lidar system, the reflected beam being a reflection of the scanning beam from the object.

In addition to one or more of the features described herein, the first deflection stage includes a liquid crystal half-wave plate that selects the rotation direction for the polarization vector and a liquid crystal polarized grating that deflects the scanning beam based on the selected rotation direction. The liquid crystal half-wave plate selects the rotation direction based on a voltage applied to the liquid crystal half-wave plate. The reflected beam passes through the first deflection stage in order to be directed to the detector. A Faraday rotator of the Lidar system is used to impart a polarization direction to the reflected beam at a polarized beam splitter that is perpendicular to a polarization direction of the scanning beam at the polarized beam splitter. In one embodiment, the first deflection stage is included in a transmitting channel and a second deflection stage is included in a receiving channel that receives the reflected beam, and the second deflection stage is synchronized with the first deflection stage. In one embodiment, the first deflection is one of a plurality of deflection stages, and rotation direction for the polarization vector of the scanning beam is selected at each of the plurality of deflection stages to achieve a selected scanning angle for the scanning beam.

In another exemplary embodiment, a Lidar system for a vehicle is disclosed. The Lidar system includes a first quarter wave plate, a first deflection stage and a detector. The first quarter wave plate produces a circularly polarized scanning beam of light. The first deflection stage selects a rotation direction for a polarization vector of the scanning beam and deflects the scanning beam by a selected angle based on the selected rotation direction of the polarization vector. The detector receives a reflected beam that is a reflection of the scanning beam from the object.

In addition to one or more of the features described herein, the first deflection stage includes a liquid crystal half-wave plate that selects the rotation direction for the polarization vector and a liquid crystal polarized grating that deflects the scanning beam based on the selected rotation direction. A voltage source applies a voltage across the liquid crystal half-wave plate, and the liquid crystal half-wave plate selects the rotation direction based on the applied voltage. In one embodiment, the reflected beam passes through the first deflection stage in order to be directed to the detector. A Faraday rotator imparts a polarization direction to the reflected beam that is perpendicular to a polarization direction of the scanning beam at a polarized beam splitter. In one embodiment, a transmitting channel includes the first deflection stage and transmits the scanning beam, and a receiving channel includes a second deflection stage and receives the reflected beam, wherein the second deflection stage is synchronized with the first deflection stage. In one embodiment, the first deflection is one of a plurality of deflection stages, and each deflection stage selects a rotation direction for the polarization vector of the scanning beam in order to achieve a selected deflection angle for the scanning beam.

In yet another exemplary embodiment, a vehicle is disclosed. The vehicle includes a Lidar system. The Lidar system includes a first quarter wave plate configured to produce a circularly polarized scanning beam of light, a first deflection stage configured to select a rotation direction for a polarization vector of the scanning beam and deflect the scanning beam by a selected angle based on the selected rotation direction of the polarization vector, and a detector configured to receive a reflected beam that is a reflection of the scanning beam from the object.

In addition to one or more of the features described herein, the first deflection stage includes a liquid crystal half-wave plate that selects the rotation direction for the polarization vector and a liquid crystal polarized grating that deflects the scanning beam based on the selected rotation direction. A voltage source applies a voltage across the liquid crystal half-wave plate, wherein the liquid crystal half-wave plate selects the rotation direction based on the applied voltage. The reflected beam passes through the first deflection stage in order to be directed to the detector. In one embodiment, a transmitting channel includes the first deflection stage and transmits the scanning beam, and a receiving channel includes a second deflection stage and receives the reflected beam, wherein the second deflection stage is synchronized with the first deflection stage. In one embodiment, the first deflection is one of a plurality of deflection stages, and each deflection stage selects a rotation direction for the polarization vector of the scanning beam in order to achieve a selected deflection angle for the scanning beam.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
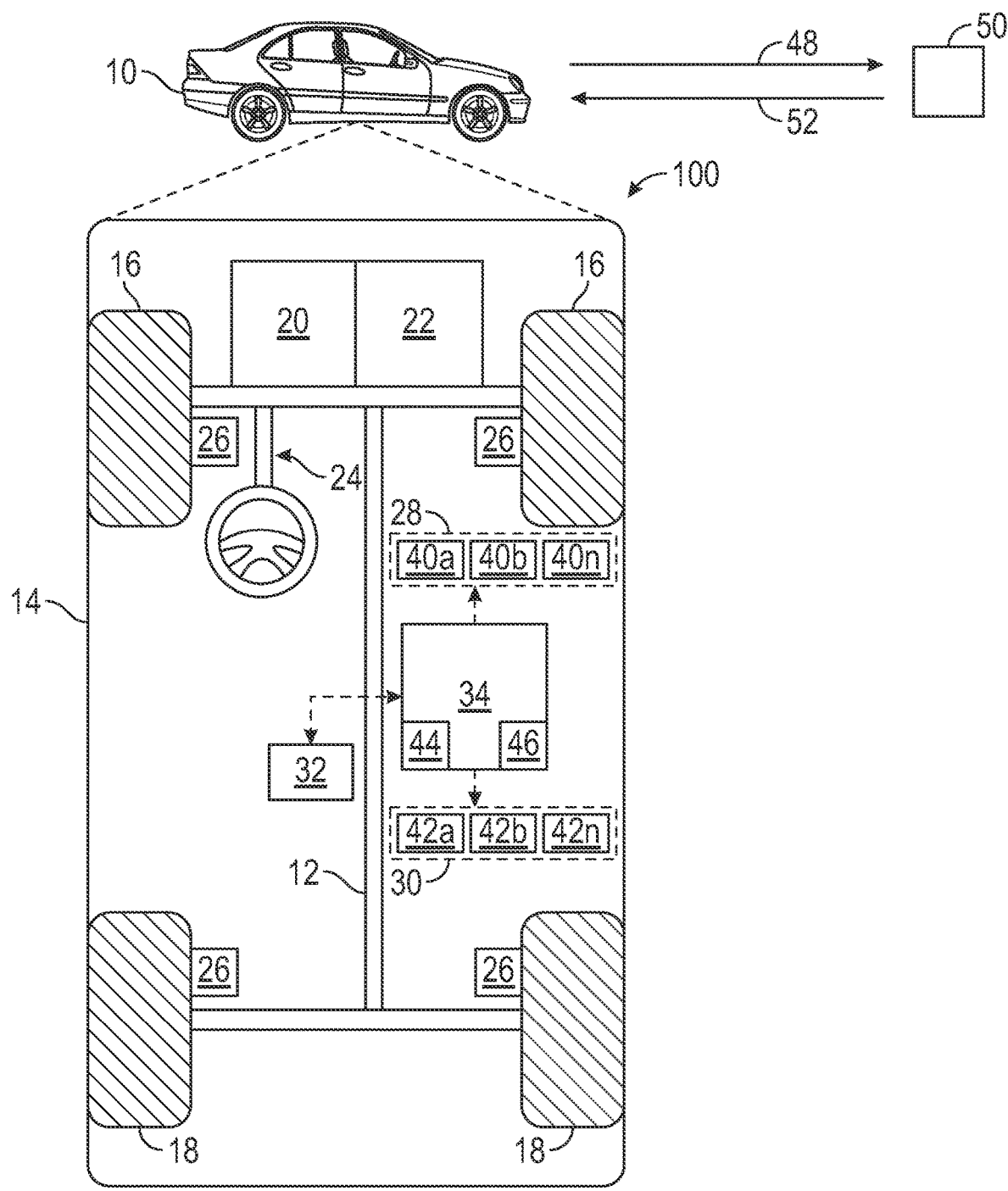
FIG. 1 shows a vehicle with an associated trajectory planning system depicted at in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18.

The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a Lidar system that sends out a scanning beam 48 of light. The scanning beam 48 can be a continuous beam of light or a pulse or series of pulses of light. The scanning beam 48 is reflected back at the vehicle 10 by one or more objects 50 in the field of view of the sensor in the form of reflected beam 52. The Lidar system further includes a scanning device or scanning mechanism for controlling a scanning or deflection angle of the scanning beam 48. In various embodiments the scanning mechanism is a solid-state device.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/their locations within the environment of the vehicle. In various embodiments the controller 34 operates the Lidar to obtain an image of a field-of-view of the Lidar system and determine locations of the objects in the field-of-view. Upon determining the location of an object 50, the controller 34 can operate the one or more actuator devices 42*a-n*, the propulsion system 20, transmission system 22, steering system 24 and/or brake 26 in order to navigate the vehicle 10 with respect to the object 50.

Figure 2:
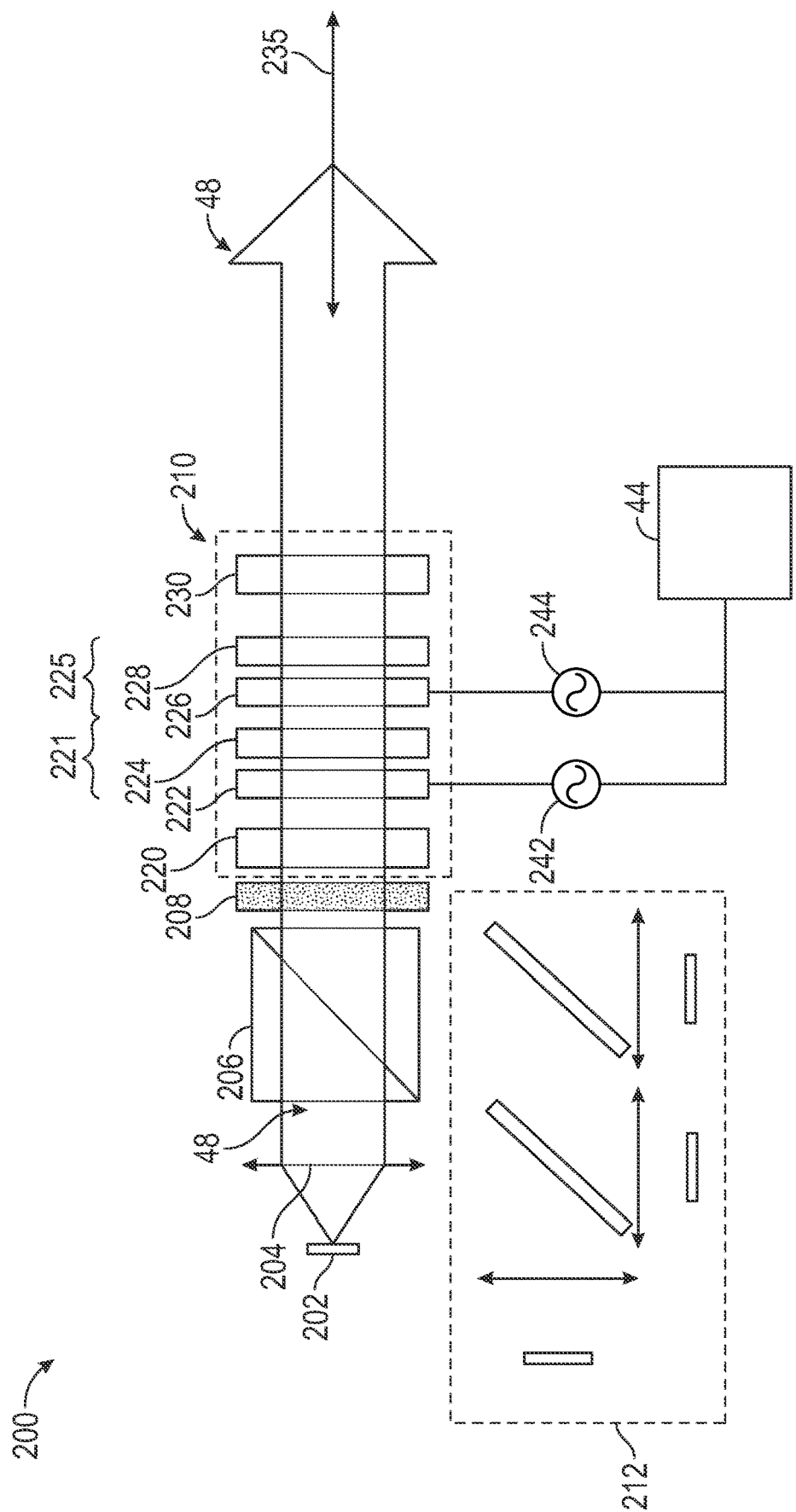
FIG. 2 schematically illustrates a Lidar system in one embodiment.

FIG. 2 schematically illustrates a Lidar system 200 in one embodiment. The Lidar system 200 includes a coherent light source such as a laser 202, a collimator 204 such as a collimating lens, a polarized beam splitter 206, a Faraday rotator 208, a scanning mechanism 210 and a sensor array 212.

The laser 202 generates a linearly polarized beam of light. In various embodiments, the wavelength of the laser light can be in a range of wavelength from about 904 nanometers (nm) to about 1600 nm depending on the spectral responsivity of the detector. The laser light emerges from the laser 202 with an angle of divergence. The collimator 204 converts the divergent beam of light into a collimated or beam of light that is parallel to a longitudinal axis 235 of the Lidar system 200. The beam of light after passing through the collimator 204 is referred to herein as a scanning beam 48 of light.

The scanning beam 48 passes through the polarized beam splitter 206. The polarized beam splitter 206 is used to direct outgoing light (e.g., the scanning beam 48) and incoming light (e.g., a reflected beam 52) along certain directions. The polarized beam splitter 206 is configured to only transmit light that is incident at the interface of the polarized beam splitter 206 with a selected polarization. Generally, incident light with its electric field along the plane of incidence is referred to as p-polarized, while light that is incident with its electric field normal or perpendicular to the plane of incidence is called s-polarized. For the sake of illustration, the polarized beam splitter 206 passes s-polarized light and reflects p-polarized light at its interface, and the collimated scanning beam 48 is s-polarized and therefore passes through the polarized beam 206 without being deflected.

The scanning beam 48 passes from the polarized beam splitter 206 through Faraday rotator 208. The Faraday rotator 208 rotates the polarization vector of the scanning beam 48 by 45 degrees.

The rotated scanning beam 48 passes through the scanning mechanism 210, which includes a sequence of plates, components or solid-state materials arranged so as to deflect the scanning beam 48 by a selected angle. In one embodiment, the scanning mechanism 210 includes a first permanent quarter wave plate (QWP) 220 and a second permanent quarter wave plate 230. A plurality of deflection stages are disposed between the first QWP 220 and the second QWP 230. Each deflection stage includes a liquid crystal half wave plate (LCHP) and liquid crystal polarized grating (LCPG) pair. In the illustrative embodiment, a first deflection stage 221 includes first LCHP 222 paired with first LCPG 224 and a second deflection stage 225 includes second LCHP 226 paired with second LCPG 228. Each of the first LCHP 222 and the second LCHP 226 is in communication with a processor, such as processor 44, and/or voltage source that controls application of a selected voltage across the LCHP. The first LCHP 222 is electrically coupled to first voltage source 242 and the second LCHP 226 is electrically coupled to second voltage source 244. The use of two deflection stages is for illustrative purposes only. There can be additional deflections stages between the first permanent QWP and the second permanent QWP in other embodiments. In various embodiments, the scanning mechanism includes a plurality of stages, and thus a plurality of LCPG devices, with each LCPG device have a different or individual deflection angles, the deflection angles ranging in value from about 2 degrees to about 6 degrees.

Figure 3:
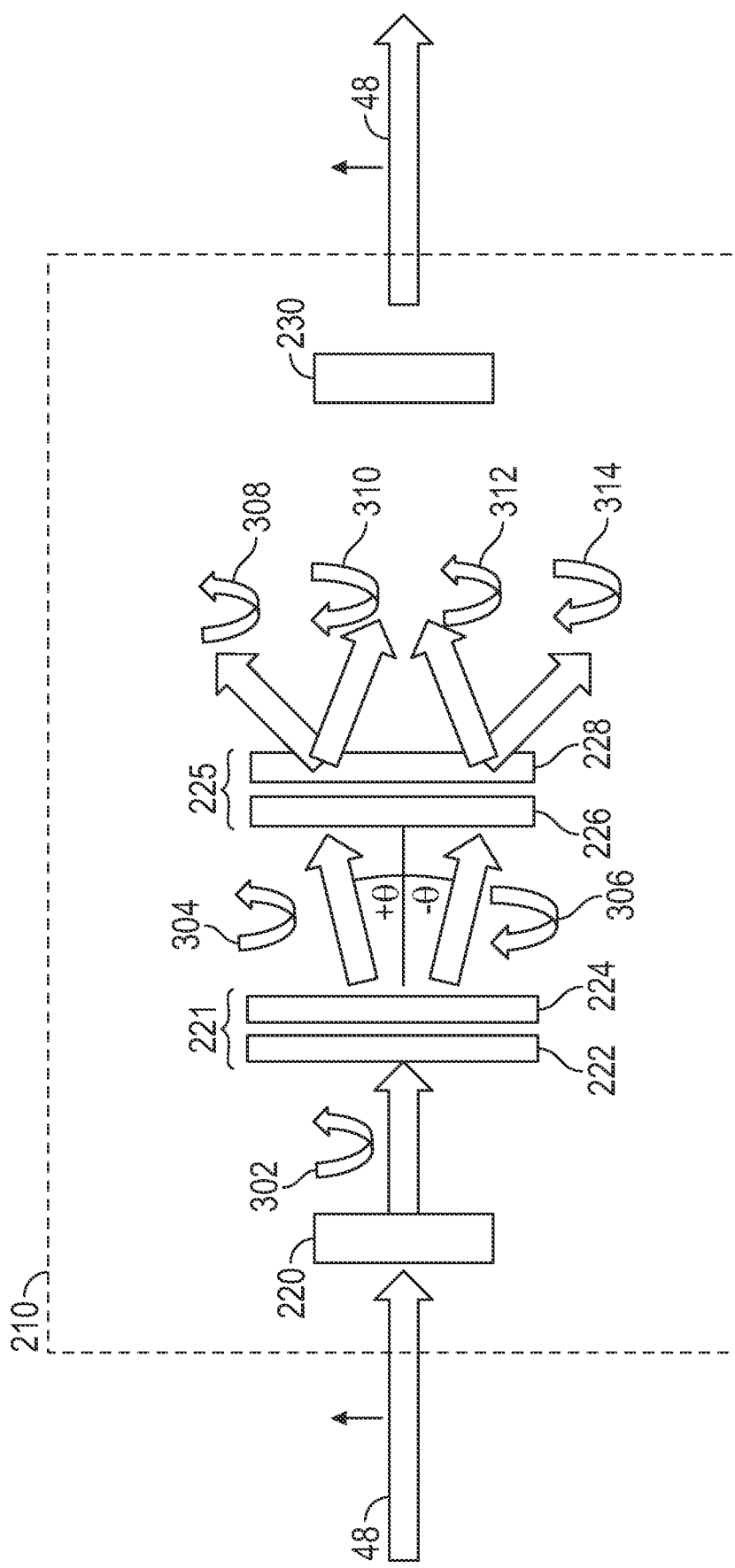
FIG. 3 illustrates operation of the scanning mechanism of the Lidar system of FIG. 2 for deflecting the scanning beam in one embodiment.

FIG. 3 illustrates operation of the scanning mechanism 210 of the Lidar system 200 of FIG. 2 for deflecting the scanning beam 48 in one embodiment. Scanning beam 48 enters the scanning mechanism 210 from the Faraday rotator 208 with a selected linear polarization. The first permanent QWP 220 introduces a phase change to the linearly polarized scanning beam 48, thereby transforming the linearly polarized light to circularly polarized light 302. Circularly polarized light has a "handedness" that describes a direction of rotation of its polarization vector. This direction of rotation can be either "right-handed" or clockwise (CW) or "left-handed" or counter-clockwise (CCW). For the purposes of illustration only, the circularly polarized light 302 is said to have a CCW rotation.

The circularly polarized light 302 passes through the first stage 221 (having first LCHP 222 and first LCPG 224) and the second stage 225 (having second LCHP 226 and second LCHP 228). Each deflection stage 221 and 225 deflects light through a deflection angle determined by the "handedness" (either right-handed or left-handed) of the light and the angular deflection range of components of the deflection stage. The LCHP of a selected deflection stage controls or selects the handedness of the light. As a voltage is applied across the LCHP, the LCHP changes the handedness of the light either from right-handed to left-handed or from left-handed to right-handed (i.e., from CW to CCW or from CCW to CW). The LCPG of the selected deflection stage deflects light through the deflection angle based on the handedness of the light. The deflection angle is either positive (+θ) or negative (−θ) based on the handedness of the light incident at the LCPG. In addition, the LCPG adds a phase shift to the light as the light passes through the LCPG.

Referring specifically to the first deflection stage 221, the CCW light 302 is incident upon first LCHP 222. Depending on the control voltage applied to the first LCHP 222, the light transmitted through the first LCHP 222 is either CCW light 304 or CW light 306. For purposes of illustration only, the CCW light 304 is deflected in a positive angle (+θ) by the first LCPG 224 and the CW light 306 is deflected by a negative angle (−θ) by the first LCPG 224. The magnitude of the deflection angle is dependent on the angular deflection range of the first LHPG 224.

At the second deflection stage 225, either CCW light 304 or CW light 306 is incident on the second LCHP 226. For the CCW light 304, the second LCHP 226 transmits either CCW light 308 or CW light 310, depending on the applied voltage. The CCW light 308 is deflected by the second LCPG 228 by another positive deflection angle (+θ), while the CW light 310 is deflected by the second LCPG 228 by a negative deflection angle (−θ). For the CW light 306, the second LCHP 226 transmits either CCW light 312 or CW light 314, depending on the applied voltage. The CCW light 312 is deflected by the second LCPG 228 by a positive deflection angle (+θ), while the CW light 310 is deflected by the second LCPG 228 by a negative deflection angle (−θ).

It is noted that the deflection angle provided by the first deflection stage 221 and by the second deflection stage 225 can be the same angle or can be different angles, based on the material and geometrical properties of their respective components. Assuming the maximum deflection by each stage is θ, limited to small angles (i.e., less than 10 degrees), then the total angular field of view OT generated by the scanning mechanism 210 is approximately equal to the angular deflection per stage times the number of stages (i.e., $θ_T$, =θ *(number of stages)). The total angular field of view can therefore be selected by selecting a suitable number of stages, and the overall deflection angle of the scanning beam 48 can be selected by a suitable selection of applied voltages to the respective stages. However, the number of stages can be limited due to optical losses generated at each stage. It is also noted that the final deflection angle of the scanning beam is a discrete scanning angle and is not changed continuously over the field-of-view of the Lidar system 200.

Upon exiting the second deflection stage 225 stage, the second permanent QWP 230 transforms the circularly polarized light back to linearly polarized light. Thus, the scanning beam 48 is a linearly polarized beam of light as it emerges at a selected angle from the Lidar system 200.

Figure 4:
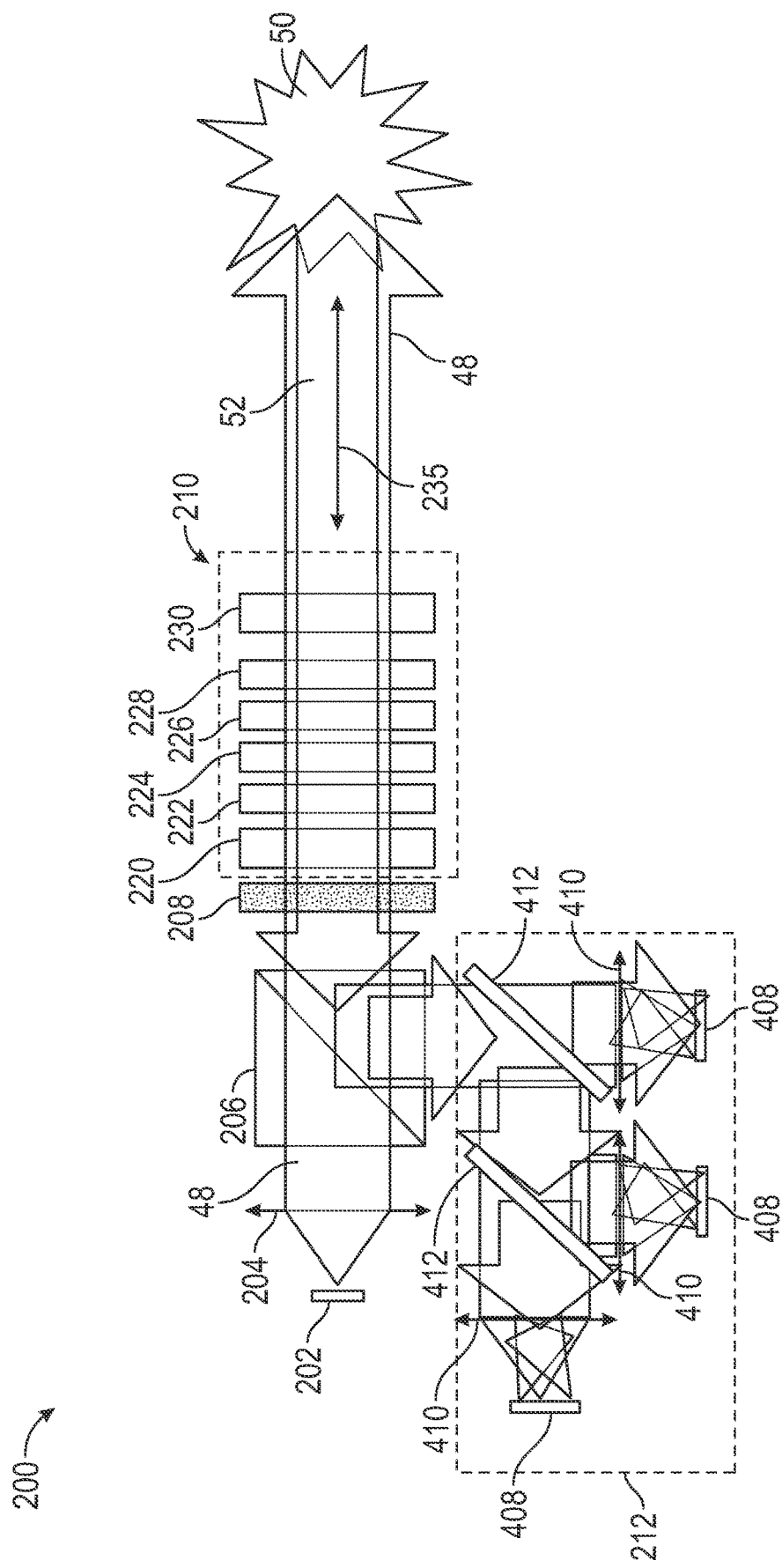
FIG. 4 schematically illustrates operation of the Lidar system of FIG. 2 in receiving a reflected beam for detection purposes.

FIG. 4 schematically illustrates operation of the Lidar system 200 in receiving a reflected beam 52 for detection purposes. The reflected beam 52 is generally a retro-reflection or backscattering of the scanning beam 48 from an object 50. The configuration of the scanning mechanism 210 is changed at a rate slow enough such that the reflected beam 52 "sees" the scanning mechanism 210 in the same configuration that was experienced by its related scanning beam 48. In other words, the voltages affecting the various LCHPs are the same for the scanning beam 48 and the reflected beam 52. Therefore, upon passing through the components of the scanning mechanism, the reflected beam 52 retraces the deflections and polarization changes experienced by the scanning beam 48, only in reverse. Thus, the deflection of the reflected beam 52 is cancelled so that the reflected beam leaves the scanning mechanism 210 parallel to the longitudinal axis 235 and with the same linear polarization as the scanning beam 48 had as it emerged from the Faraday rotator 208. The Faraday rotator 208 then rotates the polarization of the reflected beam 52 by 45 degrees. Due to the rotation of the scanning beam 48 by 45 degrees at the Faraday rotator 208 and the additional rotation of the reflected beam 52 by 45 degrees at the Faraday rotator 208, the reflected beam 52 is incident on the polarized beam splitter 206 with a p-polarization (i.e., at a 90 degree angle to the s-polarization at which the scanning beam 48 was incident at the polarized beam splitter 206). The polarized beam splitter 206 therefore deflects the reflected beam 52 at a suitable deflection angle toward the sensor array 212.

The sensor array 212 includes a plurality of detectors 408 with associated imaging lenses 410. Each imaging lens 410 forms a high resolution image of the scan region at its related detector 408. The sensor array 212 further includes one or more dichroic beam splitters 412. A dichroic beam splitter 412 transmits or reflects a beam of light based on a wavelength of the light. The dichroic beam splitters 412 can thus be used to direct different wavelengths of the reflected beam 52 to selected detectors 408. Thus, each 408 detector be made to be sensitive to light at a selected wavelength. Once images have been obtained at the different wavelengths, these chromatic images can be joined to create a total image over the entire field of view of the Lidar system. In various embodiments, the detectors 408 can obtain a plurality of images at different scanning angles as the scanning beam 48 is scanned over the field of view of the Lidar system 200. The plurality of images at the different scanning angles can be joined to reconstruct an image over the total range of the field-of-view.

In various embodiments, a detector 408 is a direct time of flight sensor. By measuring the exact time at which a pulse is generated by the laser to when the reflected light from the target reaches the sensor, the distance to the target can be deduced.

In another embodiment, a detector 408 can include an amplitude modulated source/sensor. The light source can be modulated at a known frequency and the modulation of the return signal can be correlated to the transmitted light. The detected phase shift between these modulations can be used to determine the distance to the target.

Figure 5:
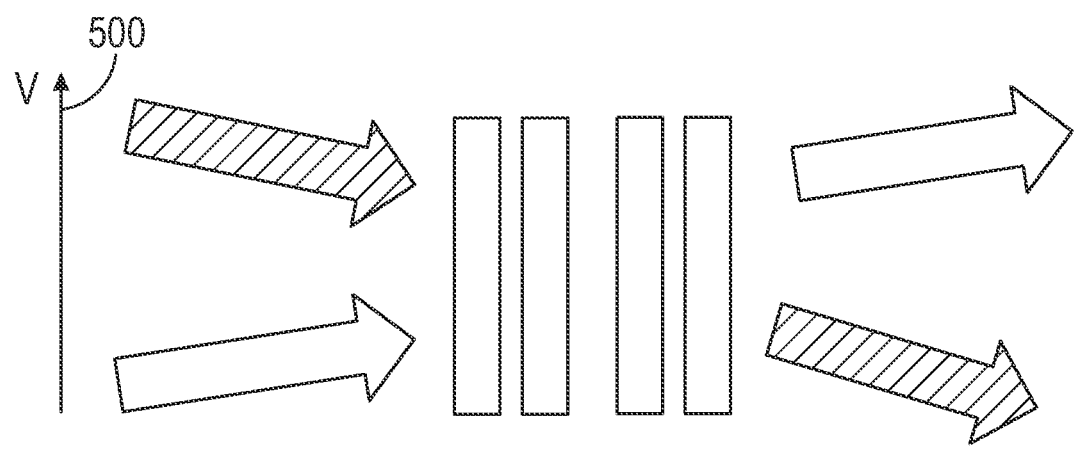
FIG. 5 shows a vertical direction perspective of components of the scanning mechanism.
Figure 6:
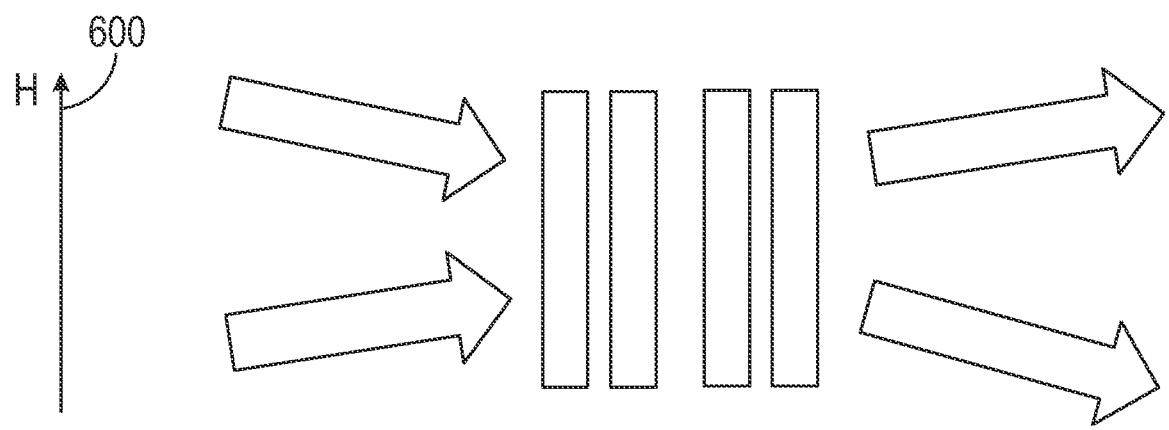
FIG. 6 shows a horizontal direction perspective of components of the scanning mechanism.

In an alternate embodiment, the incident light (e.g., the scanning beam 48) need not be incident at the surface normal to the scanning mechanism 20. Thus, multiple beams at symmetric offset angles can be scanned simultaneously. This can be implemented in either the horizontal or vertical direction, thereby allowing for an increased field-of-view for the Lidar system. FIG. 5 shows a vertical direction perspective of components of the scanning mechanism. The light incident at vertically off-axis angles are deflected accordingly in the vertical plane 500. FIG. 6 shows a horizontal direction perspective of components of the scanning mechanism. The light incident at horizontally off-axis angles are deflected accordingly along the horizontal plane 600.

Figure 7:
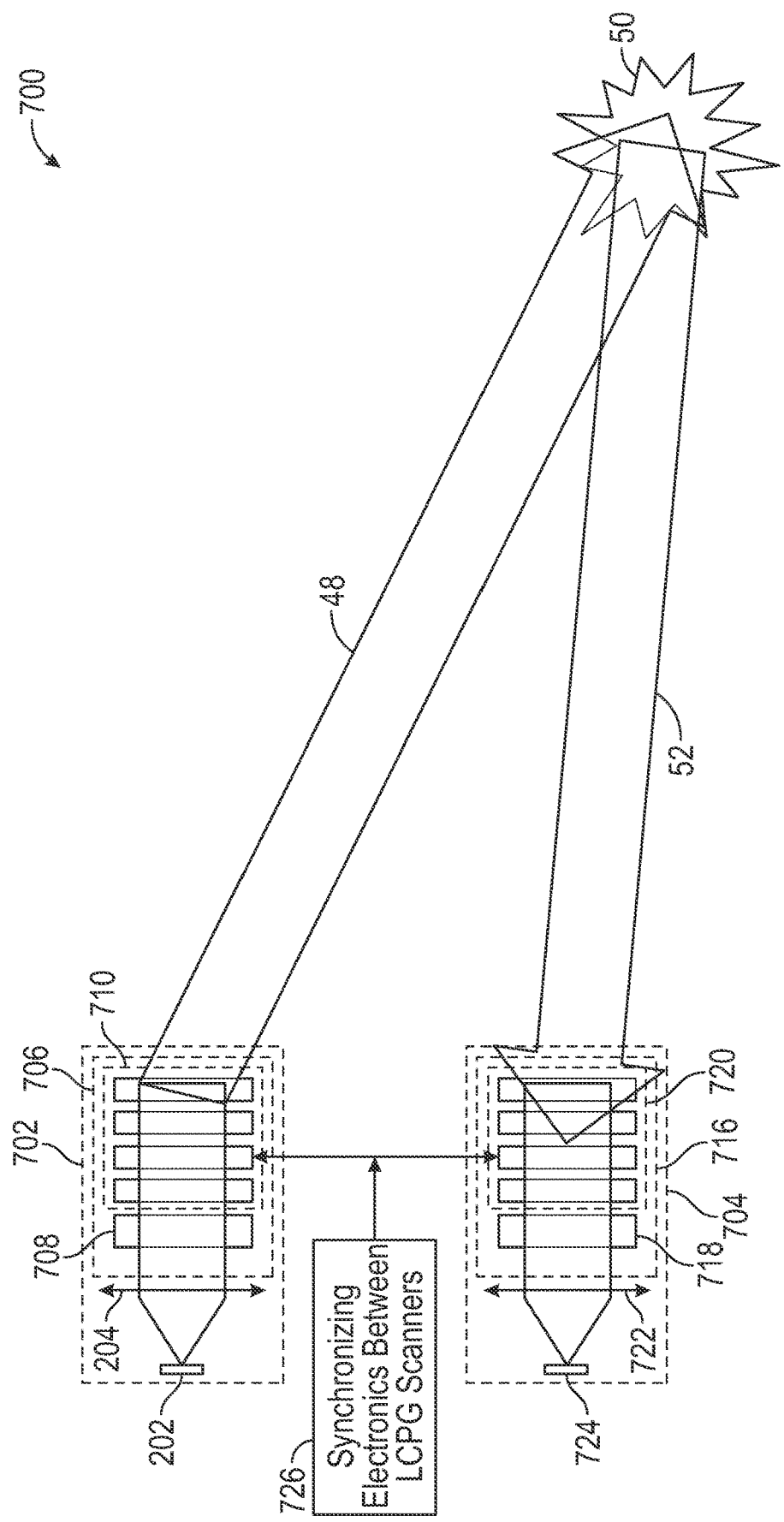
FIG. 7 illustrates an alternate Lidar system.

FIG. 7 illustrates an alternate Lidar system 700. The alternate Lidar system 700 includes a transmitting channel 702 for generating and orienting a scanning beam 48 and a receiving channel 704 for receiving and detecting a reflected beam 52 that is a backscattering of the scanning beam 48 from object 50.

The transmitting channel 702 includes the laser light source 202 and collimator 204 that produce a collimated and linearly polarized scanning beam 48. The scanning beam 48 passes through a first scanning mechanism 706 that includes a quarter wave plate 708 that converts the linearly polarized beam of light into a circularly polarized beam of light and various first deflection stages 710 for deflecting the scanning beam 48.

The receiving channel 704 includes a second scanning mechanism 716 that includes a quarter wave plate 718 and various second deflection stages 720. The number of first deflections stages 710 is the same as the number of second deflection stages 720. Each deflections stage of the second deflection stages 720 is synchronized with its corresponding deflections stage from the first deflections stages 710. Thus, the reflected beam 52 experiences the same deflections and polarization changes experienced by the scanning beam 48, only in reverse. A synchronizing electronics unit 726 applies same voltages to corresponding deflection stages of the transmitting channel 702 and the receiving channel 704 in order to maintain synchronization of the deflection angles in each channel. The reflected beam emerges from the second scanning mechanism 716 to pass through imaging optics 722 that directs the reflected beam onto sensor 724.

The alternate Lidar system 700 therefore does not employ either the polarized beam splitter 206 or the Faraday rotator 208 used in the Lidar system 200 of FIG. 2. By appropriate calibration of the transmitting channel 702 with the receiving channel 704, any observable offset of the field of view from the expected location of the field of view through the receiving channel 706 can be used to estimate the range to an object or targeted point in a region of interest.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of scanning an object with a Lidar system, comprising:
   receiving a scanning beam having an s-polarization at a Faraday rotator that rotates the scanning beam to a polarization direction at 45 degrees to the s-polarization;
   receiving the scanning beam at a scanning mechanism, the scanning mechanism comprising:
   a first quarter wave plate configured to receive the scanning beam having the polarization direction at 45 degrees from the Faraday rotator and impart a circular polarization to the scanning beam;
   a first deflection stage that deflects the scanning beam by a selected angle based on a rotation direction of the circular polarization;
   a second quarter wave plate configured to receive the scanning beam from the first deflection stage and impart a linear polarization on the scanning beam;
   reflecting the scanning beam off the object to form a reflected beam, wherein the reflected beam retraces a path of the scanning beam through the second quarter wave plate, the first deflection stage and the first quarter wave plate to enter the Faraday rotator with a polarization direction of 45 degrees to the s-polarization direction,
   rotating the reflected beam by 45 degrees at the Faraday rotator to form linear polarized light having a p-polarization; and
   detecting the object using the reflected beam of light having the p-polarization.

2. The method of claim 1, wherein the first deflection stage includes a liquid crystal half-wave plate that selects the rotation direction for a polarization vector based on an applied voltage and a liquid crystal polarized grating that deflects the scanning beam based on the selected rotation direction.

3. The method of claim 2, wherein the reflected beam passes through the liquid crystal half-wave plate with a same voltage being applied to the liquid crystal half-wave plate as when the scanning beam passes through.

4. The method of claim 1, further comprising receiving the scanning beam at the Faraday rotator from a polarized beam splitter that passes through light with the s-polarization, and wherein the reflected beam is incident on the polarized beam splitter with the p-polarization and reflected by the polarized beam splitter onto a detector.

5. The method of claim 4, further comprising receiving the scanning beam at the scanning mechanism at an angle off of a longitudinal axis of the scanning mechanism.

6. The method of claim 1, wherein the first deflection stage is one of a plurality of deflection stages, further comprising selecting the rotation direction for a polarization vector of the circularly-polarized scanning beam at each of the plurality of deflection stages to achieve a selected scanning angle for the circularly polarized scanning beam.

7. A Lidar system for a vehicle, comprising:
   a Faraday rotator configured to receive a scanning beam that is linearly polarized along an s-polarization direction and rotate the scanning beam from the s-polarization direction to a polarization direction at 45 degrees to the s-polarization direction;
   a scanning mechanism having a longitudinal axis, comprising:
   a first quarter wave plate configured to receive the scanning beam having the polarization direction at 45 degrees and impart a circular polarization to the scanning beam;
   a first deflection stage configured to deflect the scanning beam from the longitudinal axis based on a rotation direction of the circular polarization; and
   a second quarter wave plate configured to receive the scanning beam from the first deflection stage and impart a linear polarization on the scanning beam,
   wherein the scanning beam reflects off an object to form a reflected beam that retraces a path of the scanning beam through the second quarter wave plate, the first deflection stage and the first quarter wave plate to enter the Faraday rotator with a polarization direction of 45 degrees to the s-polarization direction,
   wherein the Faraday rotator rotates the reflected beam by 45 degrees to form linear polarized light having a p-polarization; and
   a detector for detecting the object using the reflected beam having the p-polarization.

8. The Lidar system of claim 7, wherein the first deflection stage includes a voltage source, a liquid crystal half-wave plate, and a liquid crystal polarized grating, wherein the voltage source is configured to apply a voltage to the liquid crystal half-wave plate, the liquid crystal half-wave plate is configured to select the rotation direction for a polarization vector based on the voltage, and the liquid crystal polarized grating is configured to deflect the scanning beam based on the selected rotation direction.

9. The Lidar system of claim 8, wherein the reflected beam passes through the liquid crystal half-wave plate with a same voltage being applied by the voltage source as when the scanning beam passes through.

10. The Lidar system of claim 7, further comprising a polarized beam splitter configured to pass the scanning beam from a laser to the Faraday rotator with the s-polarization and to redirect the reflected beam having the p-polarization to the detector.

11. The Lidar system of claim 10, wherein the scanning beam is incident on the scanning mechanism at an angle off of the longitudinal axis of the scanning mechanism.

12. The Lidar system of claim 7, wherein the first deflection stage is one of a plurality of deflection stages, wherein each deflection stage selects the rotation direction for a polarization vector of the circularly polarized scanning beam in order to achieve a selected deflection angle for the circularly polarized scanning beam.

13. A vehicle, comprising:
   a Lidar system including:
   a Faraday rotator configured to receive a scanning beam that is linearly polarized along an s-polarization direction and rotate the scanning beam to a polarization direction at 45 degrees to the s-polarization direction; and a scanning mechanism having a longitudinal axis, the scanning mechanism:

a first quarter wave plate configured to receive the scanning beam having the polarization direction at 45 degrees and impart a circular polarization to the scanning beam;

a first deflection stage that deflects the scanning beam based on a rotation direction of the circular polarization; and a second quarter wave plate configured to receive the scanning beam from the first deflection stage and impart a linear polarization on the scanning beam, wherein the scanning beam reflects off an object to form a reflected beam that retraces a path of the scanning beam through the second quarter wave plate, the first deflection stage and the first quarter wave plate to enter the Faraday rotator with a polarization direction of 45 degrees to the s-polarization direction, wherein the Faraday rotator rotates the reflected beam by 45 degrees to form linear polarized light having a p-polarization; and a detector for detecting the object using the reflected beam of light having the p-polarization.

14. The vehicle of claim 13, wherein the first deflection stage includes a voltage source, a liquid crystal half-wave plate, and a liquid crystal polarized grating, wherein the voltage source is configured to apply a voltage to the liquid crystal half-wave plate, the liquid crystal half-wave plate is configured to select the rotation direction for a polarization vector based on the voltage, and the liquid crystal polarized grating is configured to deflect the scanning beam based on the selected rotation direction.

15. The vehicle of claim 14, wherein the reflected beam passes through the liquid crystal half-wave plate with a same voltage being applied by the voltage source as when the scanning beam passes through.

16. The vehicle of claim 13, further comprising a polarized beam splitter configured to pass the scanning beam from a laser to the Faraday rotator with the s-polarization and to redirect the reflected beam having the p-polarization to the detector.

17. The vehicle of claim 13, wherein the first deflection stage is one of a plurality of deflection stages, wherein each deflection stage selects a rotation direction for a polarization vector of the circularly polarized scanning beam in order to achieve a selected deflection angle for the circularly polarized scanning beam.

* * * * *